United States Patent

Klee

[15] 3,643,435
[45] Feb. 22, 1972

[54] METHOD OF AND APPARATUS FOR ADJUSTING A DEVICE BY FLUID PRESSURE

[72] Inventor: Gerhard Klee, Frankfurt am Main, Germany
[73] Assignee: Samson Apparatebau A.G., Frankfurt am Main, Germany
[22] Filed: Apr. 3, 1969
[21] Appl. No.: 813,145

[30] Foreign Application Priority Data

Apr. 4, 1968 Germany ....................P 17 52 115.2

[52] U.S. Cl. ..............................................60/54.5 R, 92/35
[51] Int. Cl. ........................................F15b 7/00, F01b 19/00
[58] Field of Search ...................60/54.5, 54.5 HA, 54.6 HA; 92/35, 40, 45; 60/5 A, 5 R

[56] References Cited

UNITED STATES PATENTS

| | | | |
|---|---|---|---|
| 3,129,604 | 4/1964 | Hanson | 60/54.5 |
| 3,213,625 | 10/1965 | Worthen | 60/54.5 |
| 3,292,415 | 12/1966 | Hoffman | 60/54.5 X |
| 3,389,557 | 6/1968 | Backe et al. | 60/54.5 |

*Primary Examiner*—Edgar W. Geoghegan
*Assistant Examiner*—A. M. Zupcic
*Attorney*—McGlew and Toren

[57] ABSTRACT

A method of controlling a fine adjustment of a part such as a machine tool, for example, by using a stop and using a fluid pressure for indicating desirable changes in the position of the stop, comprises amplifying the signals produced by the changes in fluid pressure and transforming it into a hydraulic working pressure at a location separate from the means to be adjusted and feeding the working pressure through a connecting line to the adjusting means to effect the adjustment. An apparatus for carrying out the method comprises in its simplest form a diaphragm which is exposed on one side to the changes of fluid pressure in accordance with the adjustment necessary and which is exposed on the other side to a fluid pressure which may be a combination of a pneumatic and hydraulic pressure. The hydraulic pressure is maintained within a cylinder which is closed by a piston member which is connected to the diaphragm. Flexing of the diaphragm causes movement of the piston member to change the pressure in the hydraulic cylinder. The hydraulic cylinder is in turn connected through a line to a semirigid spring tube which forms a stop having a stop head at one end. The spring tube is made with corrugated sidewalls to permit its expansion in accordance with the pressure indications and variations of the hydraulic fluid to adjust the position of the stop head.

7 Claims, 9 Drawing Figures

Inventor:
Gerhard Klee
By McGlew & Toren
Attorneys

METHOD OF AND APPARATUS FOR ADJUSTING A DEVICE BY FLUID PRESSURE

SUMMARY OF THE INVENTION

This invention relates in general to a method and device for effecting fine adjustment of parts of operating devices, and in particular, to a new and useful method and apparatus for amplifying a control fluid pressure signal and for transmitting the amplified signal through a hydraulic fluid to an adjustment device to effect the adjustment thereof.

The fine adjustment of parts of a machine tool for example, such as a stop, a toolslide, a tool carrier, etc., is effected in accordance with the operating conditions and effects which are sensed during the machining operation. When a workpiece is being formed various factors which cause a variation of the dimensions of the part being formed, such as temperature variations, the action of external forces, etc., may be continuously observed and the operation corrected by providing adequate means for sensing the operational variations and taking them into account during the machining operation. Pneumatic servomotors and adjustable toolholders have been suggested for such fine adjustments during the machining operations. But these or similar devices have the disadvantage that they occupy a relatively large space and require a construction of the machine tool in a manner such that the tool can accommodate such correcting devices. Subsequent installation of such correcting devices presents many difficulties and frequently it is impossible as experience has shown. Replacement of these machine tools by new ones equipped with the correcting devices is usually not practical because of cost.

In accordance with the present invention there is provided a device for facilitating the adjustment of the operating parts of a machine tool which is designed so that the devices for carrying out the invention can be attached on any existing machine tool. A principle feature of the device of the invention is the use of an auxiliary energy fluid for transforming a position variation into an amplifier which acts for example, on liquid working pressure which in turn is transmitted through a conduit to the device to be adjusted. The transformation of a preferably pneumatic auxiliary energy fluid into a hydraulic working pressure is carried out at a location separate from the means to be adjusted and the amplified energy fluid response is transmitted through a conduit to the device which is thus adjusted thereby.

In this manner a pneumatic control pressure supplied, for example, by a regulator can be transformed into a very high hydraulic working pressure using a special transformer station which can be arranged outside of the machine tool or in its immediate vicinity as desired. The amplified pressure fluid response is fed to the means to be adjusted on the machine tool and the adjustment is in proportion to the amplified fluid control. The high hydraulic working pressure of the amplified response permits the accommodation of relatively large forces in a small space so that the adjusting means can be made compact and therefore can be accommodated on any machine tool.

The auxiliary energy is transformed according to another feature of the invention into a working pressure which is higher by a factor of 100 to 1,000 and the adjusting means is moved preferably during stoppages from the operating position assumed under the working pressure into the rest position. Leakage losses of the pressure medium are observed and offset by a new supply of pressure medium during the return of the adjusting means into its rest position when a predetermined learning value is exceeded. In this way friction influences in the transformer station and in the adjusting means and migration influences of existing pistons can be positively controlled. of a According to a preferred embodiment of the invention the working pressure is maintained at a level proportional to the pressures of the pneumatic or auxiliary energy by means of a followup mechanism. A device for carrying out the method of the invention is characterized by a diaphragm housing rigidly connected with a hydraulic cylinder on its one side and having an opposite side exposed to the sensed fluid pressure of the changed indicating means. A diaphragm disc carries a piston which penetrates through a pressuretight membrane into a pressure chamber of hydraulic cylinder. Changes of the position of the piston are transmitted as hydraulic energy through the hydraulic cylinder and transmitted through a conduit to adjust an element such as a stop, a toolslide, a tool carrier, etc. The diaphragm housing which is connected with the hydraulic cylinder, a piston and the connecting means for the line supplying the auxiliary energy and the actuating pressure form a transformer station which is arranged separately from the adjusting means which effects the positioning of a stop element, for example.

A preferred device for carrying out the method according to the invention is characterized by a diaphragm housing connected with a hydraulic cylinder whose diaphragm disc has a piston penetrating a pressuretight membrane and located on one side of a pressure chamber of a hydraulic cylinder. The cylinder is connected through a conduit to a tubular fluid chamber defining a stop, the walls of the stop tube being adjustable by the fluid pressure to vary the effective length or position of the stop.

In a further device of the invention a state of equilibrium is established between the pneumatic pressure in the diaphragm housing and the hydraulic pressure in the pressure chamber independently of the friction produced during the movement of the piston.

The actuating pressure line is preferably a helically wound metallic capillary tube. The stop which is adjusted is formed by an elastic corrugated tube which is connected pressuretight to a conduit to the hydraulic pressure line. The stop can also be carried by a piston whose cylinder communicates with the hydraulic pressure line. In addition the stop can also be carried by a connector having several spring tubes connected in parallel in respect to their action force line and communicating with the moving pressure line. This connector is secured through hard springs on another connector against which the spring tubes bear.

Accordingly, it is an object of the invention to provide an improved method for controlling the adjustment of parts using an auxiliary fluid pressure-sensing means comprising amplifying the auxiliary pressure-sensing means and preferably converting it into a hydraulic pressure, and transmitting the amplified pressure through a conduit to the device to be adjusted for adjustment thereof.

A further object of the invention is to provide a device for controlling adjustable parts of a working machine in accordance with sensed changes of operating characteristics comprising a diaphragm exposed on one side to the sensed operating changes as indicated by fluid pressure, and a piston connected to the opposite side of the diaphragm and operable in a hydraulic cylinder, the hydraulic cylinder being connected through a conduit to the device requiring adjustment.

A further object of the invention is to provide a device for making adjustments of machine parts using a fluid pressure-sensing arrangement and amplifying the fluid pressure at a location remote from the operating part.

A further object of the invention is to provide for an adjustment device for machine parts and the like which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there are illustrated preferred embodiments of the invention.

BRIEF DESCRIPTION OF THE INVENTION

DETAILED DESCRIPTION OF THE PREFERRED EMBODIMENTS

Figure 1:
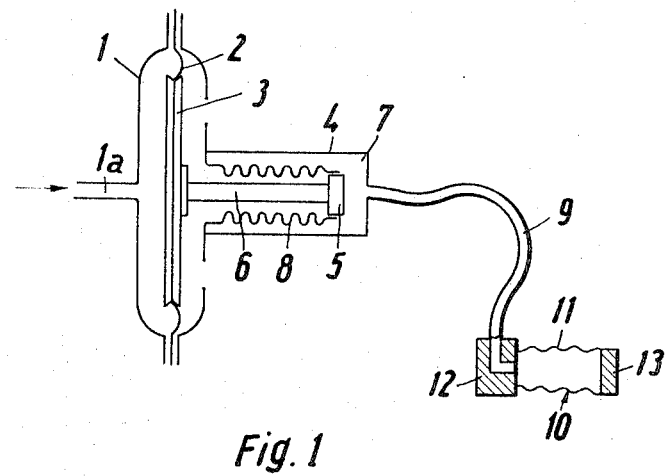
FIG. 1 is a schematic sectional view of a device for controlling the positioning of a stop constructed in accordance with the invention.

Referring to the drawings in particular, the invention embodied therein in FIG. 1 comprises a signal-amplifying and stop-setting device which includes a diaphragm housing generally designated 1 which is adapted to be connected to a fluid pressure signal through a conduit 1a and which includes a diaphragm 2 subdividing the housing. The diaphragm 2 carries a stiffening disc 3. The opposite side of the housing 1 from the conduit 1a is connected to a hydraulic cylinder 4. A piston 5 has a piston rod portion 6 which is secured to the diaphragm disc 3 and it is arranged for movement within the hydraulic cylinder 4. The hydraulic cylinder 4 is sealed on the diaphragm side of the piston 5 by means of a semirigid spring tube or bellows member 8.

In accordance with the invention the hydraulic cylinder 4 is filled with a hydraulic fluid in the chamber portion 7 and any shifting movement of the piston 5 in this chamber causes a reaction on the fluid which is transmitted through a pressure connecting line 9 to a finely adjustable stop generally designated 10.

The stop 10 is arranged in a machine tool setting, for example, to exactly limit the working stroke of a tool or workpiece in a manufacturing operation which for example may involve cutting of the workpiece by a machine tool (not shown). The stop 10 is such that it will stop the operation of the cutter for example in dependence upon operational characteristics which vary in accordance with temperature, workpiece conditions, etc. The variations are sensed for example by pneumatic pressure which is conducted through the tube 1a leading to the diaphragm housing 1.

In the embodiment indicated in FIG. 1 the stop 10 comprises a rigid spring tube 11 which is hermetically sealed at one end by a connecting piece 12 and at its opposite end it connects to a stop head 13. The pneumatic pressure sensed through the tube 1a (for detecting defects in the operational procedure and for correcting the position of the stop) will cause flexing of the diaphragm disc and the movement of the piston 5. The ratio of the diaphragm surface to the piston surface is such that an increased hydraulic pressure or an amplified control pulse is generated which is communicated through the line 9 to the interior chamber defined within a spring tube 11 of the stop 10. The spring tube 11 is designed so that its material will permit a change in dimension of the tube to provide exact positioning of the stop head 13.

Figure 2:
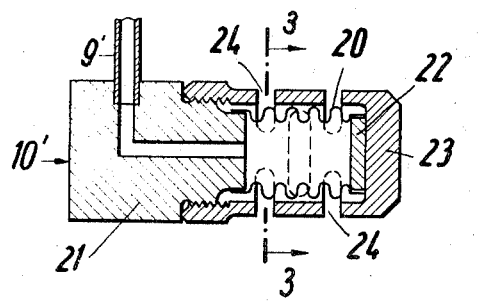
FIG. 2 is an enlarged transverse sectional view of another embodiment of stop.
Figure 3:
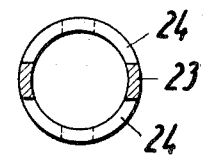
FIG. 3 is a section taken along the line 3—3 of FIG. 2.

As indicated in FIGS. 2 and 3, in those instances where the hydraulic pressures are not too high a commercial spring tube 20 can be employed. This tube 20 is soldered onto a connecting piece 21. Its opposite end face is closed by a soldered connection to a bottom piece 22. A supporting cap 23 which forms a stop head is pushed over the spring tube 20 and screwed onto the connecting piece 21. The supporting cap includes an elongated tubular body with a plurality of slits 24, each of which extends in a transverse or cross direction. The slits provide an elasticity for the tubular part in a longitudinal direction.

Figure 4:
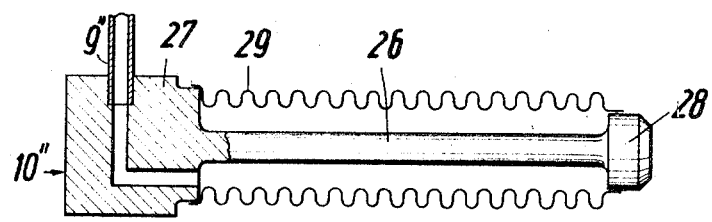
FIGS. 4 to 7 are views similar to FIG. 2 of alternate embodiments of stop.

In the embodiment indicated in FIG. 4 a connecting piece 27 for a stop generally designated 10'' is provided with an axially extending bar spring 26 which is connected at its outer end to a stop head 28. A spring tube 29 extends from the connecting piece 27 to the stop head and it is soldered at each end.

Figure 5:
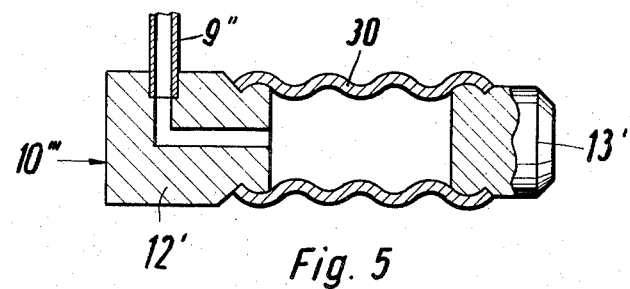

The stop 10''' indicated in FIG. 5 includes a spring tube 30 of thick-walled construction for high hydraulic pressures. The tube 30 includes flat corrugations and it is made so rigid it absorbs both the axial movements and the axial forces.

Figure 6:
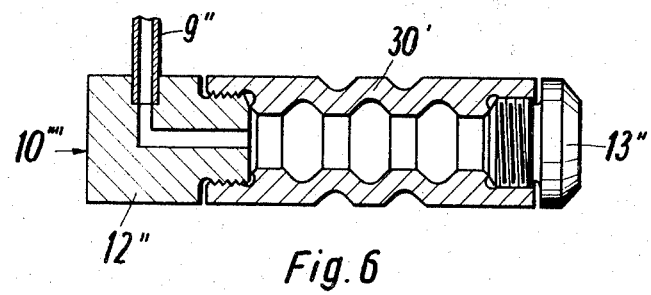

In the embodiment indicated in FIG. 6 a stop generally designated 10'''' includes a very heavy tube 30' which is screwed at its respective ends to the stop head 13'' and connecting piece 12''.

Figure 7:
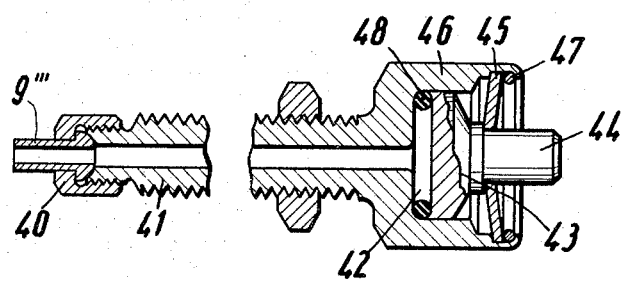

In FIG. 7 a finely adjustable stop having a hermetically sealed pressure chamber and a spring tube which permits longitudinal movement is provided. In this embodiment there is a piston 43 which bears on a cup spring 45 which is held by a flanged end face of a cylinder 46 having a cylindrical chamber 42. A ring 47 is provided to increase the support of the cup springs but several cup springs or several other springs can be provided in its place. An elastic O-ring 48 seals the piston 43. The working pressure which is supplied through the transmission line 9''' is conducted through a screw joint 40 to a coarse adjusting screw 41 and into the cylinder chamber 42.

Figure 9:
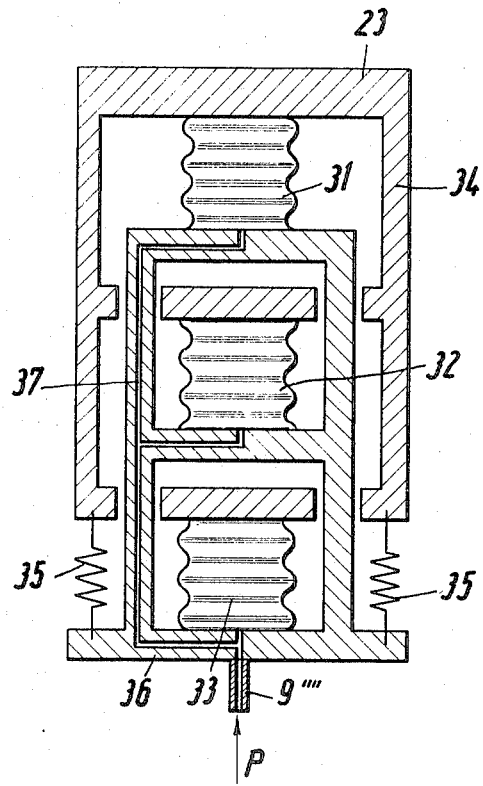
FIG. 9 is a view similar to FIG. 2 of still another embodiment of stop construction.

The last embodiment of stop indicated in FIG. 9 includes a stop head 23 and a tubular body 34 which encloses a plurality of spring tubes 31, 32, and 33. The spring tubes are arranged in series but are in parallel in respect to the reaction forces which are absorbed. The tubular body 34 is mounted on springs 35 to a connecting piece 36. The amplifying pressure tube 90'''' is connected to a connection line 37 which connects to each of the individual tubes 31, 32 and 33. This construction provides not only a finely adjustable stop but provides separatively or accumulatively acting adjusting forces. The arrangement is such that the stop is returned at the end of each operating cycle to its end position and it is brought into an operating position from this end position. Friction of the device acts always in one direction and if it remains constant will exert no influence on the adjustment of the stop.

In respect to the basic embodiment indicated in FIG. 1, the piston 5 may be sealed by gaskets and higher hydraulic pressures are employed, or may be accommodated in a hydraulic cylinder 4 with a fine fit. When gaskets are employed the friction can be reduced to zero by rotating the piston. If this is done unavoidable leakage losses must be compensated. To this end the pressure piston must be moved after each cycle into its rest position and fluid pressure must be taken in through a relief valve (not represented). A filling mechanism can also be provided which is released by the displacement of the piston due to the leakage losses and which fill the pressure chamber completely in the rest position of the piston 5.

Figure 8:
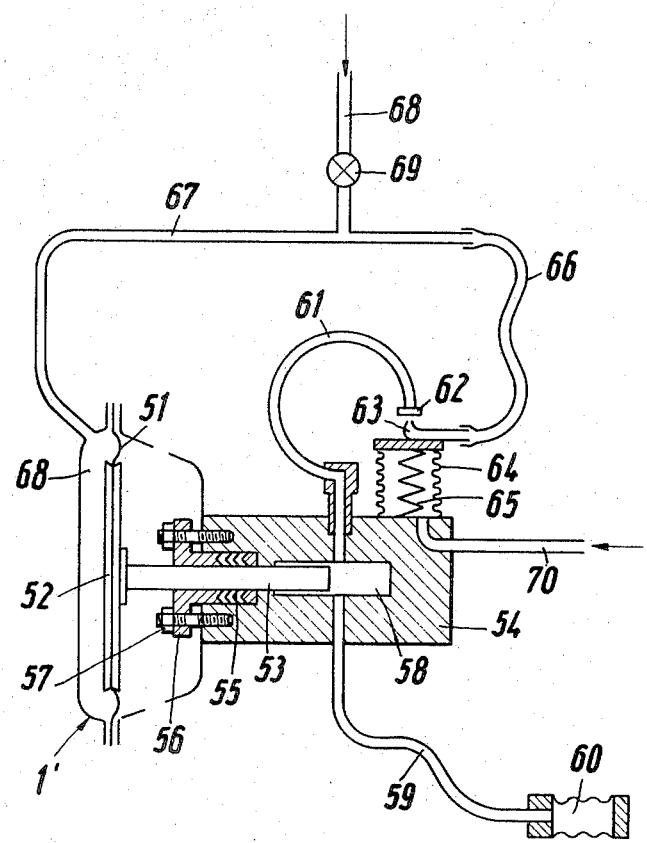
FIG. 8 is a view similar to FIG. 1 of another embodiment of the device.

Since friction between the moving parts can never be completely avoided, the means shown in the FIG. 8 embodiment are provided which includes a pneumatic return which eliminates the influence of friction on the fine adjustment of the stop. In this embodiment, a diaphragm housing generally designated 1' is provided with a diaphragm 51 which is clamped between diaphragm discs 52 which in turn are connected with a piston 53. The piston is arranged within a hydraulic cylinder 54 and it is sealed by packing 55 which can be tightened by a stuffing box 56 using screws 57. Pressure chamber 58 is connected through a pressure line 59 to a finely adjustable stop 60.

In the embodiment of FIG. 8 the hydraulic cylinder 54 is provided with a so-called Bourdon spring 61 which is connected with the pressure chamber 58. The Bourdon spring carries a baffle 62 at its outer end which is oriented at the discharge of a nozzle 63. The nozzle 63 is mounted on an end plate above a bellows 64. The bellows 64 encloses a spring 65. The nozzle 63 is formed at one end of a moving line 66 which is connected to a cascade line 67 which leads to the diaphragm housing 1'. An air supply line 68 extends into the juncture of the line 67 with the line 66 and it is provided with a throttle 69 for adjusting the air supply.

The method of operation of the device indicated in FIG. 8 is as follows:

If pneumatic pressure is conducted through an impulse line 70 and into the spring bellows 64 it expands the bellows against the action of the spring 65 and reduces the distance of the nozzle 63 from the baffle 62. The pressure in the cascade line 67 and thus the force acting on the diaphragm 51 and on the piston 53 is thus increased. Consequently the hydraulic pressure increases in the pressure chamber 58 and in the transmission line 59 to the stop 60. The higher pressure stretches the Bourdon tube 61 by an additional amount so that the baffle 62 moves away from the nozzle 63. In this manner a state of equilibrium is established between the hydraulic pressure in the pressure chamber 58 and pneumatic pressure in the pulse line 70 and independently of the friction caused by the movement of the piston 53. The stop 60 is thus shifted by a very small amount which is proportional to the pressure of the pneumatic auxiliary energy, the hydraulic working pressure being increased by the factor of 100 to 1,000 compared to the pressure of the pneumatic auxiliary energy.

What is claimed is:

1. A method for the control of adjustment means of parts of a machine tool, for example a stop, a toolslide, a tool carrier and the like using a fluid auxiliary energy to provide a correcting indication, comprising amplifying the correcting fluid energy indication into a fluid working pressure at a location remote from the adjustment means, feeding the amplified working pressure through a connecting line to the adjustment means for effecting the adjustment thereof, varying the working pressure to vary the adjustment of said adjustment means, and continuously sensing the pressure of the auxiliary fluid energy and maintaining the pressure of the fluid working pressure proportional to the pressure of the auxiliary fluid energy.

2. An apparatus for controlling the setting of adjustable devices such as a stop for operating parts of a machine, comprising a diaphragm housing, a diaphragm dividing said housing and having one side exposed to a correcting pressure impulse, a fluid control cylinder adjacent said housing, a piston movable in said control cylinder and connected to said diaphragm on the side opposite to the side exposed to the correcting pressure impulse, said piston being movable upon deflection of said diaphragm, a pressure control line connected to said fluid control cylinder and extending therefrom to the adjustable device for supplying an adjustment pressure thereto in proportion to the movement of said piston by said diaphragm, and follower means for sensing the correcting pressure and the pressure in said control line and for compensating the position of said diaphragm in accordance therewith.

3. An apparatus, according to claim 2, wherein said pressure control line comprises a helically wound metallic capillary tube.

4. An apparatus, according to claim 2, wherein said adjustable device comprises a stop said stop comprising a connecting piece adapted to be connected to said pressure control line and defining a fluid pressure cylinder, a stop head portion including a piston element slidable in said cylinder, and spring means urging said piston in a direction opposite to the force of pressure in said pressure control line and said cylinder.

5. An apparatus for controlling the setting of adjustable devices such as a stop for operating parts of a machine, comprising a diaphragm housing, a diaphragm dividing said housing and having one side exposed to a correcting pressure impulse, a fluid control cylinder adjacent said housing, a piston movable in said control cylinder and connected to said diaphragm on the side opposite to the side exposed to the correcting pressure impulse, said piston being movable upon deflection of said diaphragm, a pressure control line connected to said fluid control cylinder and extending therefrom to the adjustable device for supplying an adjustment pressure thereto in proportion to the movement of said piston by said diaphragm, said adjustable device including a stop having an outer head portion, said stop including a connecting piece connected to said pressure control line and having an outwardly extending bar spring carrying said head portion, and a spring tube surrounding said bar spring and connected to said head portion, said spring tube being connected at its interior to said pressure control line.

6. An apparatus for controlling the setting of adjustable devices such as a stop for operating parts of a machine, comprising a diaphragm housing, a diaphragm dividing said housing and having one side exposed to a correcting pressure impulse, a fluid control cylinder adjacent said housing, a piston movable in said control cylinder and connected to said diaphragm on the side opposite to the side exposed to the correcting pressure impulse, said piston being movable upon deflection of said diaphragm, a pressure control line connected to said fluid control cylinder and extending therefrom to the adjustable device for supplying an adjustment pressure thereto in proportion to the movement of said piston by said diaphragm, said adjustable device including a stop, said stop including a connecting piece base portion, and an unclosing cover, said base portion defining a passage connected to said pressure control line, said base portion defining a plurality of chambers each having a passage discharge, a spring tube in each of said chambers and enclosing the associated passage discharge and exposing the interior of said spring tube to the pressure of said pressure control line, each of said spring tubes being expandible in a direction to operate upon said connecting piece and to move it relatively to said cover, one of said spring tubes being disposed between said connecting piece and said cover, and spring means holding said cover to said connecting piece.

7. An apparatus for controlling the setting of adjustable devices such as a stop for operating parts of a machine, comprising a diaphragm housing, a diaphragm dividing said housing and having one side exposed to a correcting pressure impulse, a fluid control cylinder adjacent said housing, a piston movable in said control cylinder and connected to said diaphragm on the side opposite to the side exposed to the correcting pressure impulse, said piston being movable upon deflection of said diaphragm, a pressure control line connected to said fluid control cylinder and extending therefrom to the adjustable device for supplying an adjustment pressure thereto in proportion to the movement of said piston by said diaphragm, a stop comprising the adjustable device, said stop including a connecting piece connected to the pressure control line, and a stop head portion spaced from said connecting piece and a spring tube extending between said head portion and said connecting piece, said spring tube being of a material permitting the displacement thereof in accordance with the pressure in said pressure control line, said spring tube comprising an inner tube of wave-shaped expansible form and an outer tube surrounding said inner tube and connected to said connecting piece, said outer tube having slots therein permitting expansion thereof upon expansion of said inner tube.

* * * * *